April 10, 1951   A. J. BARRACO   2,548,337
QUICK-CHANGE GEAR CONVERTER
Filed Nov. 6, 1944   2 Sheets-Sheet 1
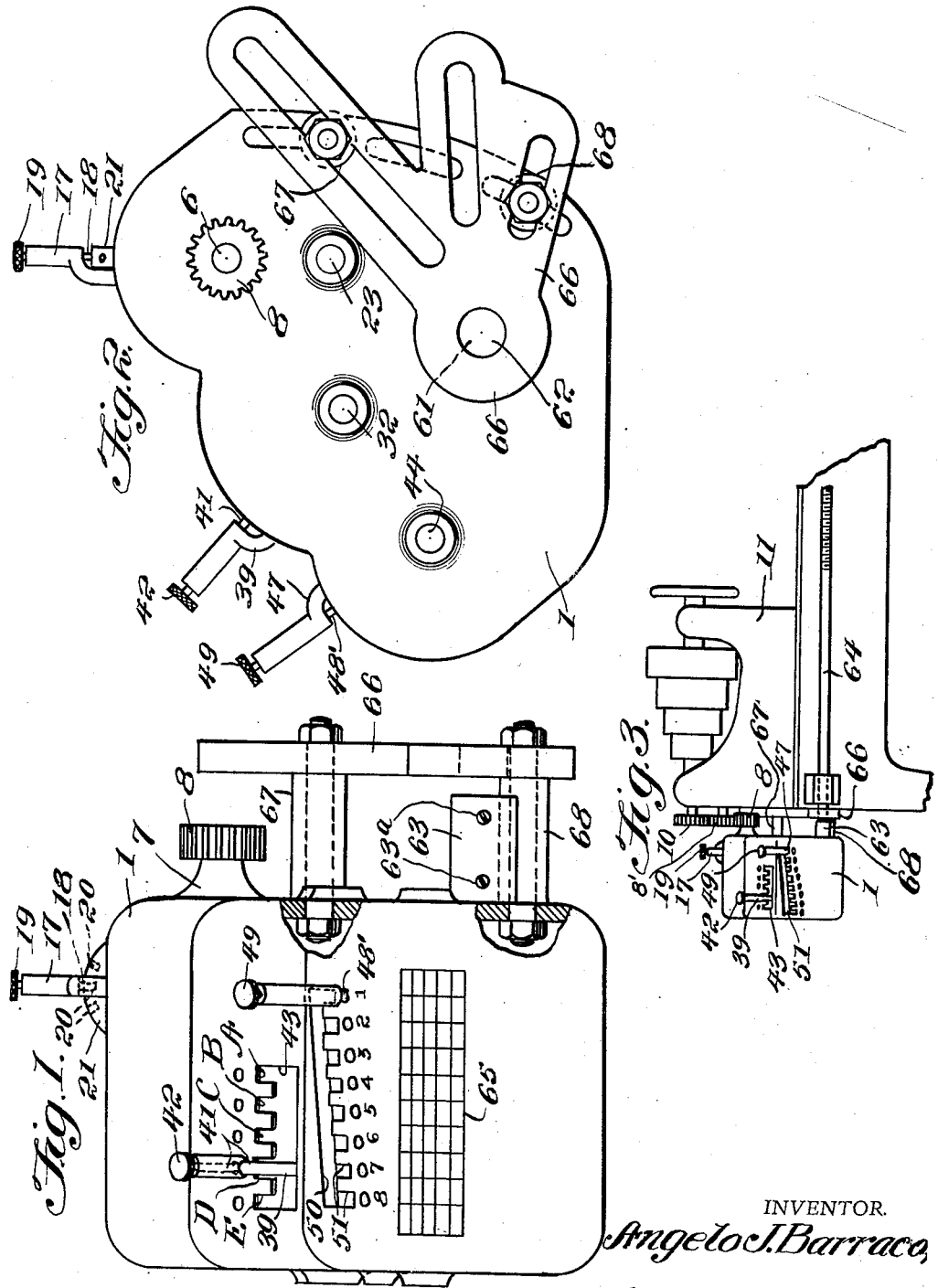
INVENTOR.
Angelo J. Barraco,
BY Victor J. Evans & Co.
ATTORNEYS April 10, 1951  A. J. BARRACO  2,548,337
QUICK-CHANGE GEAR CONVERTER
Filed Nov. 6, 1944  2 Sheets-Sheet 2
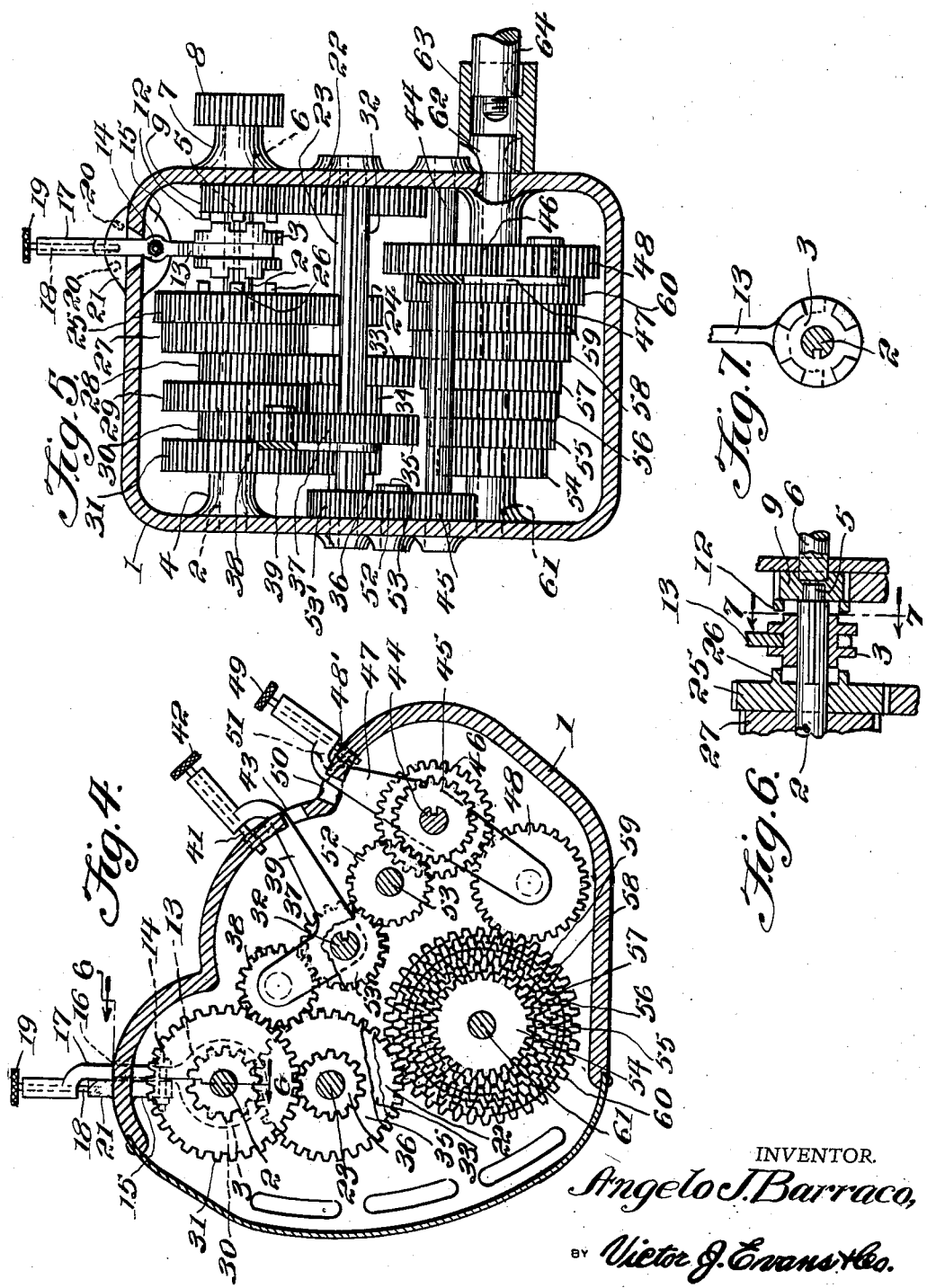
INVENTOR.
Angelo J. Barraco,
BY Victor J. Evans & Co.
ATTORNEYS Patented Apr. 10, 1951

2,548,337

UNITED STATES PATENT OFFICE 2,548,337

QUICK-CHANGE GEAR CONVERTER

Angelo J. Barraco, Irvington, N. J.

Application November 6, 1944, Serial No. 562,135

1 Claim. (Cl. 74—352)

My present invention, in its broad aspect, has to do with quick change gear converters, and is an accessory especially indicated for use on screw cutting lathes equipped with change gears of the ordinary type, and which gears would ordinarily have to be removed and recombined in order to change a feed or screw cutting ratio. With my present invention, a machine may be quickly converted into a quick change by simply removing the conventional change gears, and mounting my present improved quick change mechanism on the same bracket or holder which formerly supported the original gears.

Another object of my invention is to provide a clutch mechanism for feed speed reduction with any gear combination. This is especially desirable since many lathes do not have a clutch arrangement on the carriage for cutting feeds so that one gear setting can be used for cutting a thread by engaging the half-nut mechanism on the carriage, while by use of the clutch ordinary feed cutting is permissible since the clutch in itself provides for a feed reduction which is several times slower than thread cutting speed. In connection with this object of my invention it is pointed out that in many lathes the half nut mechanism alone is used for engaging or disengaging the carriage, and one gear set-up will permit only a feed speed or thread cutting speed but not both.

Other important objects and advantages of my invention are: (1) to provide for changes in gear ratio on lathes and similar types of machines between the power spindle and work spindle so that the machine is rendered more accurate, faster, and capable of accomplishing more purposes; (2) to provide a device which has all of the advantages of a built-in quick change mechanism, and has the further advantage of being removable where ratios are beyond the capacity of a built-in quick change mechanism of the present invention to permit substitution of regular change gears to affect special ratios; and (3) where the regular bracket or fixture for supporting the original gears is missing, an adapter plate can be used to mount my invention fitted to the peculiarities of the machine upon which it is to be used.

Other and equally important objects and advantages of my invention will be apparent from the following detailed description taken in connection with the accompanying drawings, but it is to be understood that changes in form, size, shape, arrangement and construction may be made to conform to changing conditions of practice without departing from my broad inventive concept or what is claimed.

In the drawings wherein I have illustrated a preferred form of my invention:

Figure 1 is a front elevation of my invention showing the clutch lever, gear shift levers, gear bracket, spacers, drive pinion or connection from the spindle or stud gear of a machine, and gear ratio chart;

Figure 2 is a side view of my invention;

Figure 3 is an assembly view showing my invention mounted on a lathe and connected with the lead screw;

Figure 4 is a sectional side elevation;

Figure 5 is a transverse section;

Figure 6 is a view taken on the line 6—6 of Figure 4, and

Figure 7 is a section on the line 7—7 of Figure 6.

In the drawings wherein like characters of reference are used to designate like or similar parts throughout the several views:

Mounted in the casing 1 is a shaft 2 to which is keyed for sliding movement a clutch element 3. One end of the shaft 2 is journaled in the boss 4 on the casing 1, and the other end is rotatably supported as at 5 on a pin carried by the short shaft 6 aligned therewith and journaled in the boss 7 on the housing and having mounted on one end a drive pinion 8 and on the other end a driven pinion 9, both of which are fixed to the shaft 6. The pinion 8 meshes with an idler gear 8′ and gear 8′ meshes with a pinion 10 on the spindle of the lathe 11 and pinions 8 and 10 are identical in size, pitch and ratio. A conventional belt drive may be used to drive the lathe spindle and the spindle is operatively connected to the gear 8 to rotate the latter. Pinion 9 has clutch teeth 12 for engagement with one clutch face of the clutch element 3 keyed to shaft 2 when the clutch is moved to engage the same. To move the clutch from the neutral position shown in Figure 5 there is provided a yoke 13 having a shank pivoted at 14 to a flange 15 adjacent a slot 16 in the housing. The shank is extended through the slot to form an operating handle 17 having a slidable pin 18 with a head 19 so that the pin may be moved to engage in notches 20 in the flange 21 on the housing to fix the position of the handle. By moving the handle the yoke is moved to actuate the clutch element 3 to engage the clutch teeth 12 of pinion 9 to directly drive the shaft 2 through shaft 6 and pinions 8 and 10 with no reduction in speed or change in gear ratio which is the condition ordinarily acceptable for thread cutting operations. To effect a reduction in speed and gear ratios such as is desirable for feed operations, I provide a large gear 22 keyed to shaft 23 mounted in the casing 1, and to which is keyed a pinion 24 meshing with a gear 25 freely rotatable on shaft 2. Gear 25 has clutch teeth 26 to engage clutch element 3 when moved to contact therewith so that shaft 2 is driven through pinions 8 and 10, gear 22, shaft 23, pinion 24 and gear 25.

Mounted on shaft 2 are a bank of gears 27, 28, 29, 30 and 31—these in addition to gear 25. Of these gears, 27 and 28 are fixed to shaft 2. Gears 29 and 30 revolve freely on shaft 2 and are a joined pair, and gear 31 revolves independently on shaft 2.

Mounted on shaft 23 in the casing 1 are a bank of gears 33, 34, 35 and 36. Of these gears 33 and 34 are a pair which revolve freely on shaft 23 and so also are gears 35 and 36. Gears 37 and 38 are engaged by a shifting lever 39 and gear 37 is keyed to a slotted shaft 32 for sliding movement as lever 39 is moved. Lever 39 carries a sliding pin 41 having a head 42 and extending through an elongated opening 43 in the housing, which has lateral slots A—B—C—D and E representing positions of the lever 39 in shifting gears 37 and 38—the pin 41 fitting in the slots to lock the lever in adjusted position. Another slotted shaft 44 carries gears 45 and 46, and shifting lever 47 carries gear 48. Shifting lever 47 has a sliding pin 48' with a head 49 and operates in an elongated opening 50 having slots 51 receiving the pin 48' to fix the position of the lever after the manner of lever 39. An idler gear 52 is mounted on stub shaft 53 on the casing 1, and meshes with gear 53' on shaft 32 and with gear 45 on shaft 44, as shown in Figure 5.

By shifting lever 39 so that gear 38 is meshed with gears 27, 28, 29, 30, or 31 different gear ratios are obtained and transmitted through any one of the five above-mentioned gears on shaft 2 through gears 38 and 37, shaft 32, gear 53', idler 52, gear 45, shaft 44 and gears 46 and 48 on shifting lever 47. By shifting lever 47 to positions 1-2-3-4-5-6-7-8 represented by slots 51 to mesh gear 48 with the bank of gears 54, 54, 56, 57, 58, 59 or 60, which are all fixed on shaft 61 mounted in the housing to drive a stub 62 notched to receive a collar 63 to connect the same with the notched shaft of lead screw 64 of the machine. If desired screws 63a may be provided in collar 63. It will thus be seen that through manipulation of levers 39 and 47, a highly selective number of gear ratios may be obtained, and I provide a ratio chart 65 as a guide to selection of these ratios.

On the side of my casing 1 is mounted bracket 66, and spacers 67 and 68 are provided to keep my invention in proper position and alignment with the machine to which it is applied.

The operation of the unit is as follows: For driving the lead screw 64 at various speeds, the clutch 3 is moved so that its teeth engage with the teeth on gear 25. This causes power to be transmitted from gear 8 through shaft 6, then through gear 9, then through gear 22, and then through shaft 23 to gear 24, and finally to gear 25. This results in rotation of shaft 2, since clutch 3 connects gear 25 to shaft 2. Since shaft 2 is turning, all fixed gears on shaft 2 can be selectively engaged or meshed with gear 38 by moving lever 39. As the gear 38 rotates, it causes rotation of gear 37, and since the gear 37 is keyed to the shaft 32, and since the gear 53' is keyed to shaft 32, then gear 53' is caused to turn. Meshing with the gear 53' is idler gear 52 which is mounted on stub shaft 53, and idler gear 52 meshes with the gear 45, the gear 45 being keyed to the shaft 44. Gear 46, which is keyed to the shaft 44, is also caused to turn, and since the gear 46 meshes continuously with the selector gear 48, the selector gear 48 is rotated. Thus, depending upon the position of the lever 47, the selector gear 48 will mesh with one of the gears in the lower bank of gears 54 through 60, all of which are fixed to the shaft 61. The lead screw 64 is operatively connected to the shaft 61 through members 63 and 62.

The shaft 2 may also be driven directly from shaft 6 by moving the clutch 3 into engagement with the teeth on the gear 9. Thus, as shaft 6 is rotated by the gear 8, power is transmitted directly from shaft 6 through clutch 3 to shaft 2, and then power is transmitted from shaft 2 eventually to lead screw 64, as previously described.

From the foregoing, it is believed that the operation and advantages of my invention will be apparent, but it is again emphasized that interpretation of the scope of my invention should only be conclusive when made in the light of the subjoined claim.

I claim:

In a gear converter for a lathe including a lead screw, a casing adapted to be connected to the lathe, a first shaft supported by said casing and adapted to be driven by a source of energy, a first gear keyed to said first shaft, a second shaft arranged in end-to-end relation with respect to said first shaft, a first bank of gears mounted on said second shaft, a manually operable clutch, a third shaft rotatably supported by sad casing, gear means connecting said first gear to said third shaft, a pinion gear keyed to said third shaft and meshing with one of the gears of said first bank of gears, said clutch serving to selectively connect said first shaft to said second shaft or one of the gears of said first bank of gears to said second shaft, a fourth shaft arranged parallel to said second shaft and operatively connected to said lead screw, a second bank of gears of different sizes secured to said fourth shaft, and means for selectively connecting said first bank of gears to said second bank of gears.

ANGELO J. BARRACO.

REFERENCES CITED

The following references are of record in the file of this patent:

UNITED STATES PATENTS

| Number | Name | Date |
|---|---|---|
| 736,792 | Search et al. | Aug. 18, 1903 |
| 844,541 | Schellenbach | Feb. 19, 1907 |
| 984,370 | Hendrickson | Feb. 14, 1911 |
| 1,018,081 | Reston | Feb. 20, 1912 |
| 1,068,013 | Sosa | July 22, 1913 |
| 1,250,572 | Feilhauser | Dec. 18, 1917 |

FOREIGN PATENTS

| Number | Country | Date |
|---|---|---|
| 269,769 | Italy | Dec. 2, 1929 |